Figure 1:
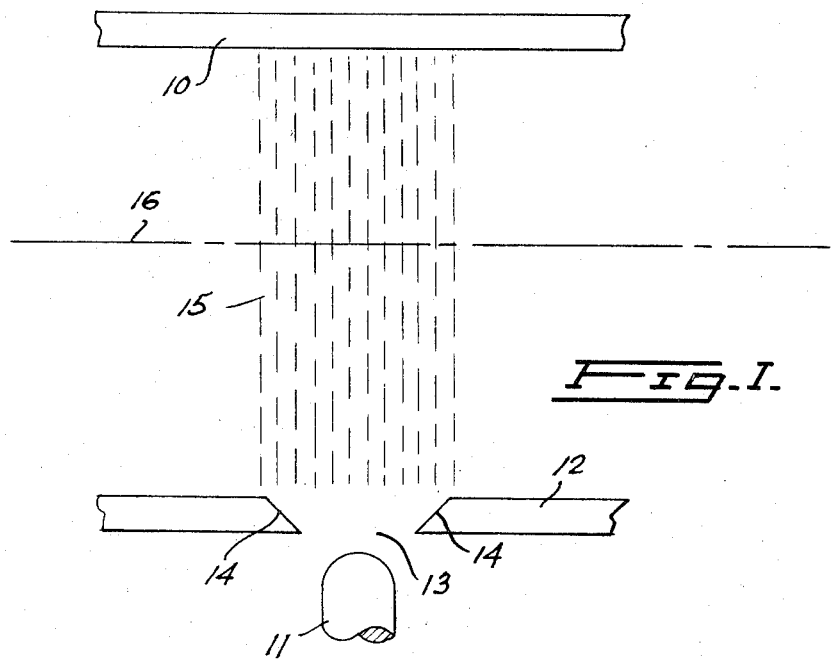

United States Patent [19]
Hyne

[11] 3,848,202
[45] Nov. 12, 1974

[54] TRANSVERSE EXCITATION SYSTEM FOR GAS LASER USING THREE ELECTRODES

[75] Inventor: Graham Everett Hyne, Ste. Foy, Quebec, Canada

[73] Assignee: The Minister of National Defence of Her Majesty's Canadian Government, Ottawa, Canada

[22] Filed: May 23, 1972

[21] Appl. No.: 256,044

[30] Foreign Application Priority Data
Sept. 13, 1971 Canada .................................. 122687

[52] U.S. Cl............ 331/94.5 PE, 330/4.3, 313/189, 313/197, 313/198
[51] Int. Cl.............................................. H01s 3/22
[58] Field of Search..................... 331/94.5; 330/4.3; 313/189, 197, 198

[56] References Cited
UNITED STATES PATENTS
3,657,600  4/1972  Wiegand, Jr............................ 317/4

OTHER PUBLICATIONS
Lamberton et al., Electronics Letters, Vol. 7, Nos. 5 & 6, Mar. 25, 1971.

LaFlamme, Review of Scientific Instruments, Vol. 41, No. 1, Nov. 1970, pp. 1578–1581.

Primary Examiner—Ronald L. Wibert
Assistant Examiner—R. J. Webster
Attorney, Agent, or Firm—Cushman, Darby & Cushman

[57] ABSTRACT

An electrode structure for the excitation of a polyatomic gas laser consisting of an anode extending in the direction of the optical axis of the laser and a cathode on the opposite side of the axis to that of the anode, and a plasma forming electrode adjacent to the cathode with an opening therein in alignment with the cathode. When a high voltage pulse is placed between the anode and the cathode, an initial discharge occurs between the cathode and the plasma forming electrode and then a pumping discharge occurs between the plasma forming electrode and the anode.

14 Claims, 6 Drawing Figures

3,848,202

TRANSVERSE EXCITATION SYSTEM FOR GAS LASER USING THREE ELECTRODES

The present invention relates to transversely excited atmospheric pressure gas lasers and more particularly to carbon dioxide lasers. Recent developments in the field of gas lasers have permitted operation at atmospheric pressure. Such operation has been achieved utilizing an electrical discharge transverse to the optical axis of the laser to pump the laser gas to obtain laser operation. Where the laser device is an oscillator, apparatus known as an optical resonator is utilized to obtain oscillation with a partially reflective mirror used at one end of the optical resonator through which the outputs from the laser is obtained.

The original electrode structure utilized in atmospheric pressure carbon dioxide lasers consisted of an enlarged anode extending parallel to the optical axis of the laser with a plurality of pin electrodes positioned on the other side of the optical axis facing the anode. An electrical capacitor of an appropriate value was charged to a high DC potential such as for example 35 kilovolts and was discharged through the electrode structure to excite the laser gas in the laser cavity. In the Jacques Beaulieu Canadian application Ser. No. 017,844 filed Apr. 19, 1968, which issued Apr. 25, 1972 as Canadian Pat. No. 898,874, there is disclosed such an electrode structure in which individual impedances are associated with each of the pin electrodes to stabilize the discharges between pin electrodes and the anode. Other Canadian patent cases of background interest are the Albert Laflamme et al. application Ser. No. 060,715, filed Aug. 29, 1969, which issued Apr. 11, 1972 as Canadian Pat. No. 897,754 and the Martin Hale et al. application Ser. No. 060,716 also filed Aug. 29, 1972 and issued as Canadian Pat. No. 927,465 on May 29, 1973.

It is now well known that for proper laser operation to occur, the type of discharge between the cathode pins and the anode should be what is called a uniform or diffuse discharge and not a bright arc discharge. A bright arc discharge is characterized by a concentration of charge carriers at one or more locations in the laser cavity through which substantially all of the electric discharge occurs and is further characterized by a bright electrical discharge between the anode and cathode. A shower discharge is sometimes present consisting of a plurality of fine visible discharge "threads" of arc. When a bright arc or streamer discharge occurs the gas in the laser cavity is not pumped efficiently. A shower discharge is also less efficient than the diffuse discharge but more efficient than the bright arc.

In contrast when a diffuse or plasma discharge occurs a broad area of discharge of glow is seen with no bright filaments in the discharge, the discharge having a uniform character throughout the laser cavity. When such a diffuse discharge occurs the highly desirable population inversion of the laser gas is obtained and a strong laser pulse results. Inherently all atmospheric pressure carbon dioxide lasers are pulse devices which are energized with a high voltage, high current electrical pulse of extremely short duration, for example 1 microsecond.

The present invention is directed to an improved electrode structure for the transverse excitation of polyatomic gas lasers and more particularly carbon dioxide lasers. With a conventional pin laser of the sort illustrated in the Beaulieu application as aforesaid, the maximum current per pin has been limited to approximately 10 amps. With the electrode structure of the present invention the current has been increased up to 3,000 amps per individual cathode member without the onset of bright arc discharges. Moreover the present invention permits the construction of extremely short laser devices, for example, a laser has been constructed having one cathode discharging to an anode and providing a laser output of 50 kwatts with an output energy of 10 milli joules and a pulse length of 100 nanoseconds.

In accordance with the present invention an electrode structure for the transverse excitation of a gas laser comprises, an anode extending parallel to the laser axis in the laser cavity, at least one cathode positioned on the opposite side of the laser cavity from the anode, the cathode extending in a direction toward the anode and having an end directed toward the anode. A planar metallic plasma forming electrode is positioned between the anode and cathode and has an opening formed therein in alignment with the end of the cathode. The plasma forming electrode is positioned on the same side of the optical axis as the cathode and the spacing between the end of the cathode and the edges of the opening in the plasma forming electrode is generally much less than the distance between the plasma forming electrode and the anode. The plasma forming electrode is connected to the anode by a current limiting electrical impedance which may be merely stray impedance whereby on the application of a high voltage pulse between the anode and the cathode an initial discharge occurs between the end of the cathode and the plasma forming electrode and then a large diameter main diffuse discharge occurs between the plasma forming electrode and the anode (the plasma forming electrode becoming the cathode of the diffuse discharge). In a preferred form of electrode structure the cathode is elongated and includes a rounded end, the plasma forming electrode has an opening which is circular, whose axis intercepts the centre of curvature of the rounded end, and is chamferred at an angle of approximately 45° on the side of the electrode away from the cathode. Preferably the opening in the plasma forming electrode is within the range of about ½ to about 3 or more times the diameter of the rounded end of the cathode. Smaller sizes of hole lead to pinch off effects.

It is also contemplated within the scope of the present invention to provide an electrode structure including a plurality of cathodes and a plasma forming electrode in which an opening is provided in front of each of the cathodes so that a diffuse discharge occurs from the plasma forming electrode to the anode adjacent, initiated from each opening in the plasma forming electrode. The cathodes may for instance be formed in a single row parallel to the optical axis of the laser cavity, or may be distributed in a plane parallel to the optical axis and symmetrical with the plane of the anode.

Figures 2, 3:
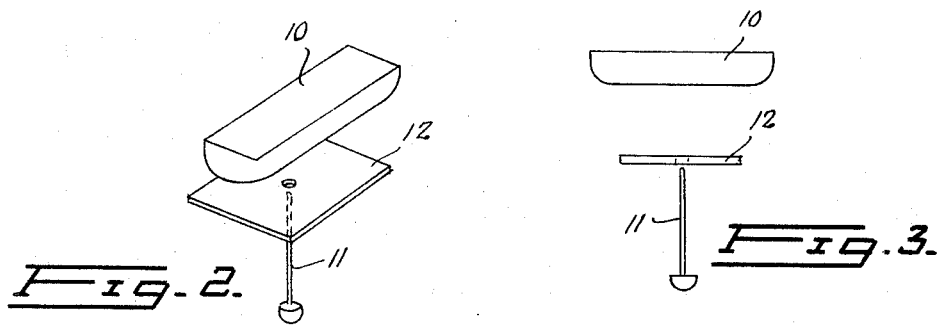
Figure 4:
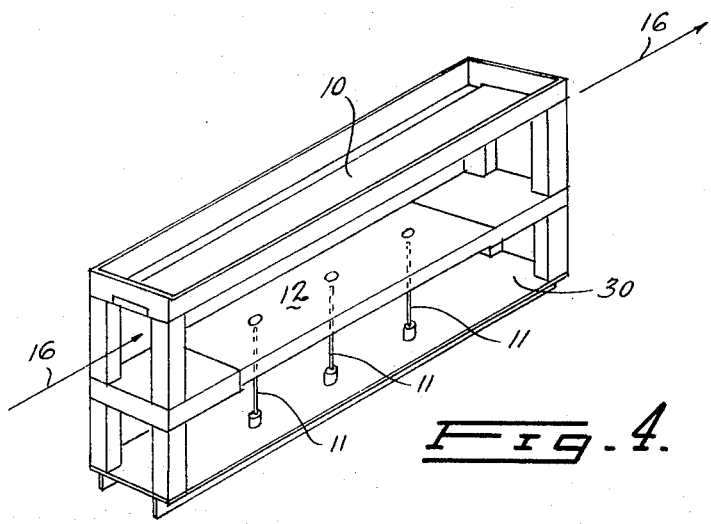
Figure 5:
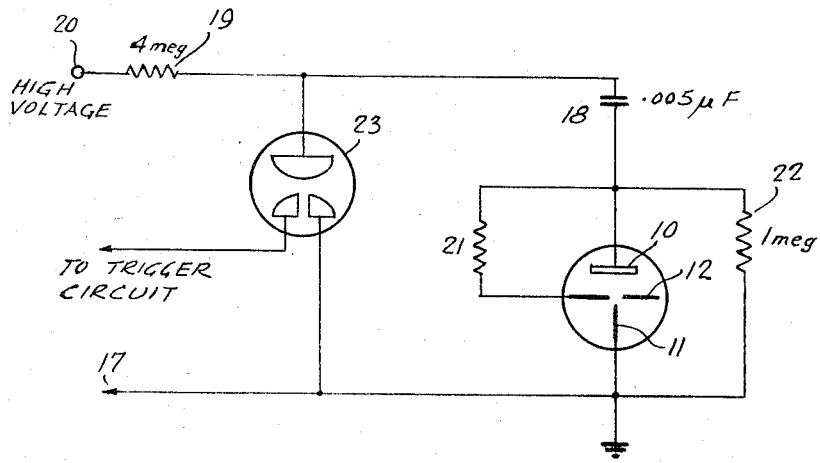
Figure 6:
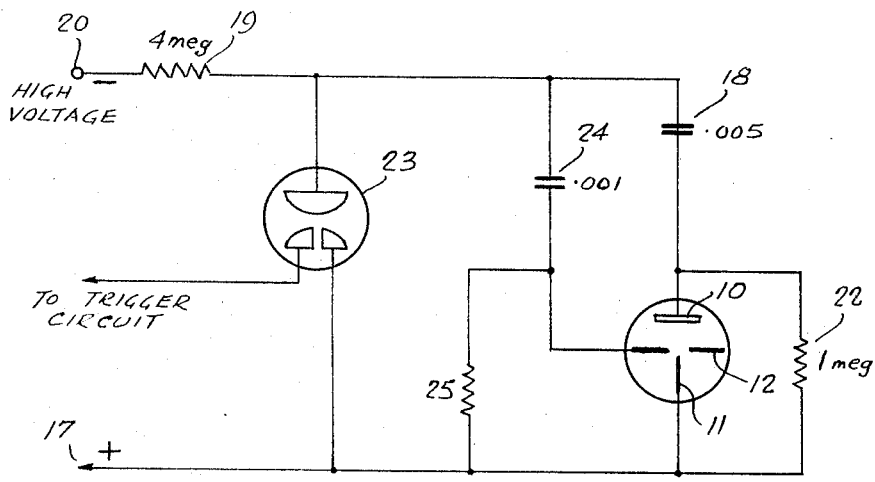

In the accompanying drawings which illustrate embodiments of the present invention:

FIG. 1 is a schematic diagram partially in cross-section to illustrate the operation of apparatus pursuant to the present invention, FIG. 2 is a perspective view of the electrodes of a laser constructed pursuant to the invention, FIG. 3 is a cross-sectional view of the apparatus of FIG. 2, FIG. 4 is a perspective view of a multi-cathode apparatus pursuant to the present invention, FIG. 5 is an electrical circuit diagram of a laser energization system pursuant to the present invention, and FIG. 6 is a circuit diagram of an alternative form of circuit.

Referring to FIG. 1 there is illustrated a one cathode laser pursuant to the present invention consisting of an anode 10, a cathode 11, and a plasma forming electrode 12. An opening 13 having chamferred edges 14 is provided in the plasma forming electrode 12. On connection of the anode, cathode and plasma forming electrode in an appropriate electrical circuit, a plasma or diffuse discharge 15 is obtained between the plasma forming electrode 12 and the anode 10. The plasma discharge 15 is highly effective in pumping a $CO_2$ laser whose optical axis is represented at 16. When high voltage pulses are applied between the anode 10 and the cathode 11 diffuse discharges are obtained between the anode 10 and the plasma forming electrode 12 and laser operation is obtained in a resonant cavity.

Typical dimensions for such a laser device would be a diameter of 1/32 to ¼ inch or more for the cathode 11, a thickness 1/16 of an inch for the plasma forming electrode 12, the hole 13 having a diameter of equal to or greater than the cathode, and the chamferred edges 14 being chamferred at angle of approximately 45°. The size of the hole should not normally be less than ½ the cathode diameter to avoid pinch off effects and is preferably up to, but not limited to, 3 times the diameter. The separation between the anode 10 and the plasma forming electrode 12 is dependent upon the voltage of the electrical power supply and would be of the order of ½ to 1 ¼ inches for a range of voltage from 15 to 45 kilovolts. Larger spacings would be optimum with higher voltages. Preferred materials for the anode 10 and the plasma forming electrode 12 are aluminium, and a preferred material for the cathode is nickel of nickel-plated steel. Lasers as illustrated in FIG. 1 have been constructed utilizing brass components, however after two or three hours of operation the characteristics of the laser begin to deteriorate, whereas when aluminium plasma forming electrodes and anodes are utilized, together with nickel-plated steel cathodes operation of the laser continues for a long period of time without deterioration. The higher the voltage and the greater the current the wider the cylinder of diffuse discharge 15. The apparatus does not appear to be critical with respect to gas mix and will lase with a wide variation of gas mix. The applicant prefers to operate $CO_2$ lasers with less than the conventional amount of helium in the gas mixture, and a typical gas mixture would be 17% $CO_2$, 70 percent helium, 13 percent nitrogen. The apparatus as illustrated works well at atmospheric pressure and with certain embodiments three distinct light pulses have been obtained for a single electrical energization pulse. Following the principles illustrated in FIG. 1, a laser pursuant to FIGS. 2 and 3 has been constructed and operated. The laser illustrated in FIGS. 2 and 3 consists of an anode 10, a cathode 11, and a plasma forming electrode 12. This apparatus was constructed using an aluminium anode, 1 inch by ½ inch with rounded edges, the plasma forming electrode consisted of a flat brass plate 1 inch by 1 inch by 1/32 inch in thickness with a number 54 hole drilled at its center. The cathode consisted of a nickel-plated pin No. T00 manufactured by Gala Toledo. The electrode structure illustrated in FIGS. 2 and 3 was assembled in an acrylic tube with laser mirrors mounted at both ends. A 100 percent reflective mirror with a focal length of 2 ½ meters was mounted at one end while a 98 percent reflective window was mounted at the other. Using a gas mix of 66 percent helium, 17 percent nitrogen, and 17 percent carbon dioxide, and the electrical circuit illustrated in FIG. 5, an output of 10 millijoules was obtained with a peak power of 50 killowatts at a repetition rate up to 40 pulses per second, the repetition rate being limited by the output obtainable from the power supply. The capacitance utilized originally as the main discharge capacitor was 0.002 microfarads. When this was reduced to 0.0005 microfarads, laser action could be maintained by increasing the percentage of helium to 75 percent and maintaining the $CO_2 : N_2$ percentage ratio of about 17:13.

FIG. 5 illustrates the electrical connections for operation of the laser illustrated in FIGS. 2 and 3. The cathode 11 is connected directly to ground and to one side of the high voltage supply 17. The anode is connected via the 0.005 microfarad capacitor 18, and the 4 megohm resistor 19 to the other terminal of the power supply 20. The plasma forming electrode 12 is connected to the anode 10 via resistor 21. The value of this resistor is not critical, values used have ranged from 5 to 100 kilohms. A further resistor 22 having a resistance of 1 megohm is connected from the anode 10 to the cathode 11. The capacitor 18 is charged by the high voltage supply connected to the terminals 17 and 20, and is discharged through the spark gap 23 which is operated by a trigger circuit (not shown). With a voltage of 35 kilovolts applied to the terminals 17 and 20, good laser operation was obtained using a gas mix of 17 percent carbon dioxide, 70 percent helium to 13 percent nitrogen.

FIG. 4 is a perspective view of a three cathode laser constructed pursuant to the present invention. Once again cathodes 11 are positioned adjacent openings in a plasma forming electrode 12 and a plasma or diffuse discharge occurs between the plasma forming electrode 12 and the anode 10. A brass support plate 30 is provided in which bearings are fitted so that the positioning of the cathodes 11 with respect to the plasma forming electrode 12 may be individually accomplished. The apparatus illustrated in FIG. 4 was constructed utilizing a plasma forming plate 3 inches in length with an anode one inch wide. This configuration was impedance operated in conjunction with the electronic circuitry shown in FIG. 6. In this case the current limiting impedance for the plasma forming electrode included an external capacitor 24. Fifty-five millijoule pulses were produced with a 0.005 microfarad condenser 18 charged to 32 kV. The gas utilized was 80 percent helium and 10 percent each of carbon dioxide and nitrogen. The percentage malfunction of the plasma forming plate was less than 0.1 percent. The distance between the anode and the plasma forming plate was ¾ inch and 1/32 inch between the plasma forming plate and the cathodes 11. Subsequently the laser illustrated in FIG. 4 was modified by splitting the plasma forming electrode into three separate sections which were wired together with a piece of No. 22 standard wire gauge wire soldered to the plates inside the cavity, and one common lead brought out for the plasma forming electrode. For reasons not explained a more uniform distribution of the plasma along the length of the laser was obtained. This problem was subsequently solved by using aluminium for the anode and the single plasma forming plate.

Subsequently a 32 cathode laser was constructed using 32 plasma forming electrodes giving a laser having an active optical cavity of 32 inches. This laser under a limited test produced one joule of laser energy utilizing a power supply voltage of 38 kV with a main discharge condenser of 0.02 microfarads at 4 pulses per second. The anode to plasma forming electrode clearance was ½ inch, the current pulse length was 60 nanoseconds at the base, and the current per cathode was 100 amperes. The optics consisted of a 10 meter focal length mirror and a 20 percent reflective window. The dimensions of the light output at 10.6 microns was a rectangle 9/16 inch by ⅜ inch. Electrode contamination became a problem after approximately 4 hours of operation, and the laser output ceased. Subsequently, a 12 cathode laser following the construction techniques shown in FIG. 4 was constructed, the plasma forming electrode being formed by a 12 inch by 2 inch by 1/32 inch brass plate with 12 No. 52 holes chamferred toward the anode, the anode consisting of a stainless steel plate. The shape of the plasma discharge between the plasma forming electrode and the anode was somewhat conical with the point of the cone being located in the chamferred openings in the plasma forming electrode. The anode was replaced by an aluminium anode and the plasma produced became cylindrical. The plasma forming plate was replaced with one made of aluminium and finally the anode and plasma forming electrode were sand blasted. This laser was operated for 50 hours without any contamination of the electrodes.

During operation of the apparatus illustrated in FIG. 4 it was found necessary to adjust the clearance between the cathodes 11 and the plasma forming electrode 12. This adjustment was carried out with 30 kV DC pulses being applied to the laser. With the cathodes 11 spaced ¼ inch from the plasma forming electrode 12, it appears that arcs are formed between the cathode and the plasma forming electrode and a separate arc between the plasma forming electrode and anode. On reducing the clearance between the cathodes and the plasma forming electrodes, a homogenous plasma is formed between the plasma forming electrode and the anode. On continuing to reduce the clearance another critical point was reached where the plasma discharge between the plasma forming electrode 12 and the anode 10 was replaced with an arc discharge. Adjustment of the individual cathode can be effected to ensure that the cathodes all carry the same current and that all clearances between the plasma forming electrode and the cathodes pins are uniform. This ensures a uniform plasma along the whole length of the optical cavity. It is expected that the cathodes may be altered in shape, within the limitations involved in high voltage work, beyond the simple cylinders with rounded ends essentially of the same radius as the cylinder, shown in the embodiments of FIGS. 1, 2 and 3.

Referring to FIG. 6, there is shown a suitable electrical operating circuit for the laser illustrated in FIG. 4. Components with a like function to those illustrated in FIG. 5 have been assigned the same reference numerals as discussed above. Additionally a 0.001 microfarad capacitor 24 and a 10 meg ohm resistor 25 were added to the circuit. Once again high voltage was applied between the terminals 17 and 20 to charge the capacitor 18 through the resistor 19 and the resistor 22. The capacitor 18 was discharged by triggering the spark gap 23 from a trigger circuit, not shown.

It is also within the scope of the present invention to provide a plurality of cathodes which instead of being positioned in a single line parallel to the optical axis of the laser are staggered either side of such a line that form in effect alternate lines of cathodes with holes formed in the plasma forming electrode appropriately opposite each cathode. A column of plasma discharge will be centered above each cathode to provide a wide band of excitation in the active volume of the laser and a broader output than would be obtained with a single row of aligned cathodes.

For reasons not adequately understood, an elongated slot will not work in place of the individual openings in the plasma forming electrode. It appears necessary to provide an individual cathode and an individual opening adjacent each cathode to obtain proper operation. The advantage obtained by the presence of the plasma forming electrode is to initiate discharge between cathode and plasma forming electrode and then to allow diffuse discharge between plasma forming electrode and anode. Thus the electrical plasma is enlarged and spread to a larger diameter than can be obtained with an individual cathode electrode, and to permit a substantial increase in the current in the plasma discharge. Currents as high as 3,000 amps. per cathode have been obtained in the operation of apparatus pursuant to the present invention, whereas the highest figures obtained prior to the present invention were of the order of 10 amps.

This results in laser outputs of up to 10 joules per liter of active volume of the medium, by optimizing circuitry this can be increased. The theoretical limit is about 30 joules/liter.

The embodiments of the invention in which an exclusive property or privilege is claimed are defined as follows:

1. In a gas laser having a population inversion region for containing an active laser gas and having a longitudinal axis and means including a three electrode structure for the transverse excitation of the laser gas in said region for creating said population inversion, the improvement wherein said electrode structure comprises:
an anode extending parallel to said longitudinal axis in said region,
at least one uninsulated metal cathode pin positioned on the opposite side of said longitudinal axis from said anode and longitudinally extending in a direction toward said anode,
a plasma forming electrode positioned fully between said anode and cathode pin and having an opening formed substantially in alignment with the longitudinally projecting cathode pin,
said plasma forming electrode being positioned on the same side of said longitudinal axis as said cathode pin,
the spacing between the cathode pin and the edges of the opening in said plasma forming electrode being much less than the distance between the plasma forming electrode and the anode, and wherein
said population inversion means includes means for applying a high voltage pulse across said anode and cathode pin to cause a discharge between the cathode pin and plasma forming electrode and current limiting impedance between said plasma forming electrode and said anode operative in conjunction with said spacing between said cathode pin and the edges of the opening in said plasma forming electrode and the potential difference between said plasma forming electrode and anode resulting from said high voltage pulse for causing solely a diffuse plasma discharge between said plasma forming electrode and anode to excite said laser gas.

2. The improvement as in claim 1 wherein said impedance includes capacitance.

3. The improvement as in claim 1 wherein said impedance includes a resistance.

4. The improvement as in claim 1 wherein said plasma forming electrode is provided with a plurality of said openings and a plurality of cathode pins are provided respectively adjacent said openings on the opposite side of said plasma forming electrode as said anode and at a distance to cause said plasma discharge to exist.

5. In a carbon dioxide laser having a population inversion region for containing carbon dioxide as an active laser gas and having a longitudinal axis and means including a 3-electrode structure for the transverse excitation of said carbon dioxide gas in said region for creating said population inversion, the improvement wherein said electrode structure comprises:
an anode extending parallel to said longitudinal axis in said region,
at least one uninsulated metal cathode pin positioned on the opposite side of said longitudinal axis from said anode and longitudinally extending in a direction toward said anode,
a planar metallic plasma forming electrode positioned fully between said anode and cathode pin and having an opening formed substantially in alignment with the projecting cathode pin,
said plasma forming electrode being positioned on the same side of said longitudinal axis as said cathode pin,
the spacing between the cathode pin and the edges of the opening in said plasma forming electrode being much less than the distance between the plasma forming electrode and the anode, and wherein
said population inversion means includes means for applying a high voltage pulse across said anode and cathode pin to cause a discharge between the cathode pin and plasma forming electrode and current limiting impedance between said plasma forming electrode and said anode operative in conjunction with said spacing between said cathode pin and the edges of the opening in said plasma forming electrode and the potential difference between said plasma forming electrode and anode resulting from said high voltage pulse for causing solely a diffuse plasma discharge between said plasma forming electrode and anode to excite said carbon dioxide gas.

6. The improvement as in claim 5 wherein said cathode pin is cylindrical, the opening in said plasma forming electrode is circular, is aligned with the axis of the cathode pin, and is chamfered at an angle approximately 45° on the side of said plasma forming electrode away from said cathode pin.

7. The improvement as in claim 6 wherein the diameter of said opening is greater than one-half of the diameter of said cathode pin.

8. The improvement as in claim 7 wherein said impedance includes capacitance.

9. The improvement as in claim 7 wherein said impedance includes a resistance.

10. The improvement as in claim 5 wherein said plasma forming electrode is provided with a plurality of said openings and a plurality of cathode pins are provided respectively adjacent said openings on the opposite side of said plasma forming electrode as said anode and at a distance to cause said plasma discharge to exist.

11. The improvement as in claim 5 wherein said impedance includes capacitance.

12. The improvement as in claim 5 wherein said impedance includes a resistance.

13. The improvement as in claim 5 wherein said anode is formed of aluminum.

14. The improvement as in claim 13 wherein said plasma forming electrode is formed of aluminum.

* * * * *